United States Patent [19]
Dorner et al.

[11] 3,947,322
[45] Mar. 30, 1976

[54] REACTOR PRESSURE VESSEL SUPPORT ARRANGEMENT

[75] Inventors: Heinrich Dorner, Erlangen; Eberhard Michel, Nurnberg, both of Germany

[73] Assignee: Siemens Aktiengesellschaft, Munich, Germany

[22] Filed: May 21, 1974

[21] Appl. No.: 471,913

[30] Foreign Application Priority Data
May 25, 1973 Germany............................ 2326907

[52] U.S. Cl. ............ 176/87; 176/DIG. 2; 248/146; 248/DIG. 1
[51] Int. Cl.² ......................................... G21C 11/08
[58] Field of Search................. 176/38, 87, DIG. 2; 248/146, DIG. 1, 157, 423

[56] References Cited
UNITED STATES PATENTS

| | | |
|---|---|---|
| 3,129,836 | 4/1964 | Frevel .............................. 176/87 X |
| 3,716,451 | 2/1973 | Van Sickel et al. ............... 176/87 X |
| 3,771,499 | 11/1973 | Marroni, Jr. et al........... 248/DIG. 1 |
| 3,775,250 | 11/1973 | Scholz et al. ...................... 176/38 X |
| 3,821,079 | 6/1974 | Jabsen .............................. 176/87 X |
| 3,841,593 | 10/1974 | Muto .................................. 248/146 |

*Primary Examiner*—Verlin R. Pendegrass
*Assistant Examiner*—P. A. Nelson
*Attorney, Agent, or Firm*—Kenyon & Kenyon Reilly Carr & Chapin

[57] ABSTRACT

A reactor pressure vessel is supported at its bottom end by an inverted frusto-conical surface concentric with the axis of the vessel and fixed to its bottom, this surface slidably resting on an upright frusto-conical surface which is also concentric with the vessel's axis. Radial thermal movements of the reactor's bottom results in diameter changes in the conical surface fixed to its bottom so that this surface by cam action moves up and down on the other surface, and with a properly defined angularity, compensates for the vertical thermal expansion of the vessel which occurs simultaneously with its radial expansion.

7 Claims, 2 Drawing Figures

REACTOR PRESSURE VESSEL SUPPORT ARRANGEMENT

BACKGROUND OF THE INVENTION

A pressurized-water reactor pressure vessel has coolant pipes radiating from its upper portion and connecting with steam generators. With temperature changes, the vessel thermally expands and contracts.

To prevent such thermally induced motion from unduly stressing the coolant pipes, the vessel may be supported adjacent to the pipes which radiate from its upper portion. For greater support it is desirable to also support the vessel via its bottom, but this introduced the problem that if the vessel is supported mainly via its bottom its vertical thermal expansion and contraction motions displace the coolant pipes and place undesirable stresses on them and their connections with the vessels and the steam generators.

SUMMARY OF THE INVENTION

The object of the present invention is to support the vessel entirely or it least mainly by way of its bottom without introducing such stressing due to the thermal vertical expansion and contraction of the vessel.

According to the invention, the bottom of the vessel has a short cylinder fixed to it and providing an inverted frusto-conical surface pointing downwardly, this cylinder and its surface being concentric with the axis of the vessel and expanding and contracting radially with radial expansion and contraction of the vessel. This surface slidably rests on an upright frusto-conical surface provided by a short cylinder of the same diameter as the ring fixed to the vessel, and which rests on a suitable foundation which can be provided in the bottom of the usual concrete pit in which the vessel is positioned. The two surfaces are concentric and their angularities are the same.

The result of the above is that when the vessel thermally expands vertically and, therefore, also radially, the diameter of the cylinder fixed to the vessel's bottom changes, and by cam action the two surfaces provide vertical motion. The angularity of the two surfaces can be made so that as the vessel thermally expands its bottom moves downwardly and when it contracts vertically, its bottom moves upwardly, so that there is no motion at the vessel's top or upper portion from which the coolant pipes extend. This permits the coolant pipes to remain immovable vertically and reduces or eliminates their stressing previously described.

When the coolant pipes extend horizontally and substantially straight between the vessel and the steam generators, the stressing of the pipes due to the radial expansion and contraction of the upper portion of the vessel, can be greatly reduced by mounting the steam generators so that they can slide horizontally in the direction the pipes horizontally expand and contract.

Other features will be understood from the following.

BRIEF DESCRIPTION OF THE DRAWINGS

The preferred mode for carrying out the invention is illustrated by the accompanying drawings in which.

DETAILED DESCRIPTION OF THE INVENTION

Figure 1:
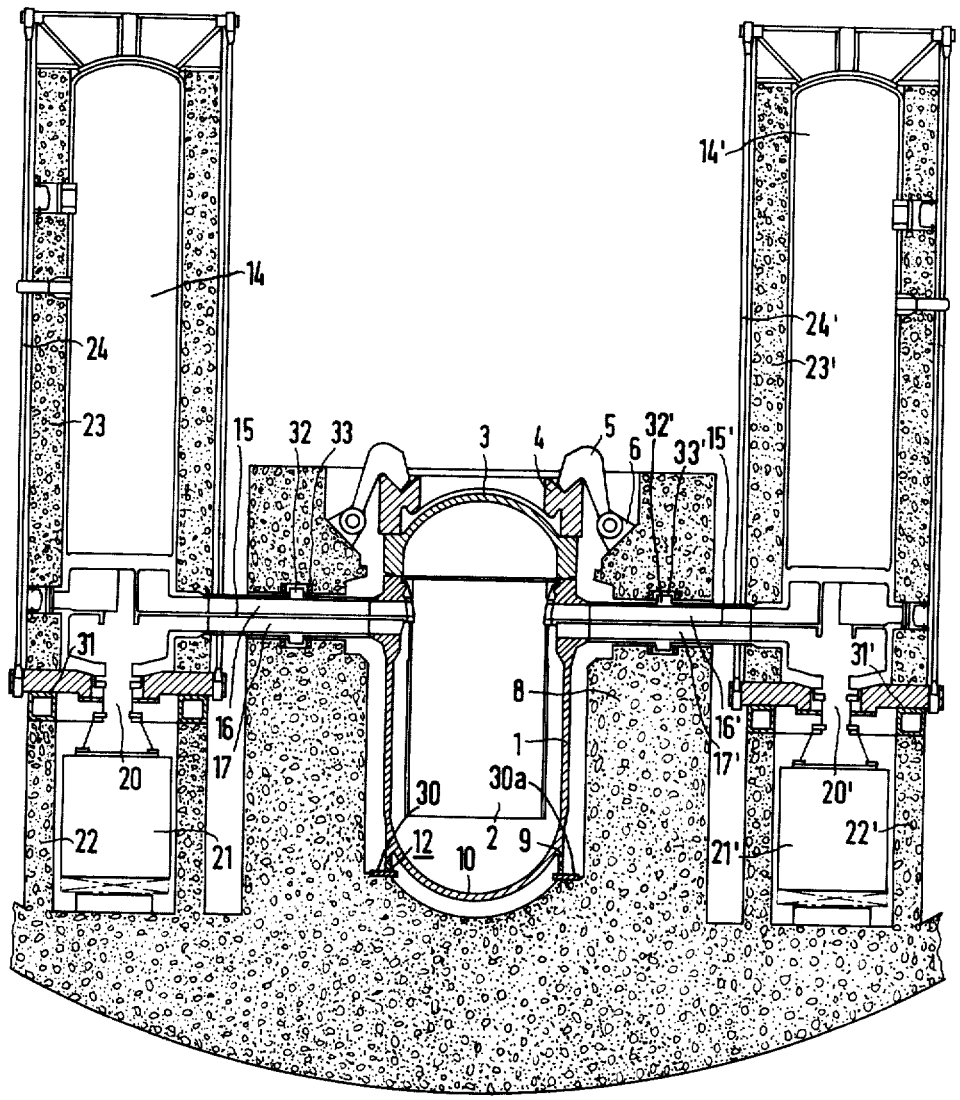
FIG. 1 is a vertical section showing a pressurized-Water reactor pressure vessel with its coolant pipes and steam generators contained within concrete containments.

The reactor pressure vessel 1 is substantially cylindrical with its axis vertical and within its core barrel 2, the reactor core (not shown) is positioned. The vessel has a top closure 3 normally bolted closed. An intercept ring 4 engages the periphery of the cover 3 and is held down by hooks 5 which pivot on hinges 6 secured to the upper portion of the cylindrical concrete containment 8 forming the pit in which the pressure vessel is positioned. The intercept ring and hook arrangement is disclosed and claimed by the Dorner et al U.S. application Ser. No. 315,932, filed Dec. 18, 1972.

The bottom of the vessel 1 has a shoulder 9 at the periphery of its spherical bottom 10, and which is supported by the support arrangement 12 of the invention.

Two identical steam generators 14 and 14' are connected with the upper portion of the vessel 1 by dual coolant pipes 15 and 15'. These pipes are in each instance divided by a horizontal partition so that the pipes provide coolant loops, respectively comprising hot legs 16 and 16' and cold legs 17 and 17'. The steam generators are of the type integrated or structurally combined with the main coolant pumps for the loops, the pumps being respectively shown at 20 and 20' driven by electric motors 21 and 21', the pumps being contained by concrete cylinders 22 and 22'. The substantially cylindrical steam generators extend upwardly from these motors and pumps within concrete containments 23 and 23' vertically held in compression by tie rods 24 and 24'.

Figure 2:
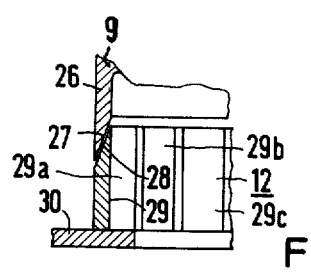
FIG. 2 is a vertical section on an enlarged scale of a segment taken from FIG. 1.

The arrangement 12 is shown on an enlarged scale by FIG. 2. Here, the short cylinder and cylindrical ring 26 is shown as being integral with the shoulder 9 of the vessel 1, although this ring 26 could be fixed to the periphery of the spherical bottom 10 of the vessel, by welding. This cylindrical ring 26 has substantially the same diameter as the vessel's bottom and is concentric with the axis of the vessel and its bottom. The bottom end of this ring 26 provides the inverted frusto-conical surface 27 which faces downwardly and is slidably supported by the upwardly facing upright frusto-conical surface 28 provided by a short cylinder or cylindrical ring 29 which is fixed as by welding to a flat steel base ring 30 resting on a shoulder 30a formed in the bottom of the concrete reactor pit and, therefore, capable of supporting the weight of the reactor vessel.

In operation, if the diameter of the reactor vessel thermally increases, the surface 27 slides downwardly on the surface 28, and since at the same time the reactor vessel is elongated vertically, compensation for the vertical elongation is provided. The top portion of the vessel remains substantially unchanged as to its vertical position, vertical displacement of the pipes 15 and 15' being, therefore, avoided and eliminating vertical stressing.

Furthermore, the pressure vessel, intercept ring 4 and hooks 5 may be designed so that when the vessel is at its normal operating temperature, the hooks 5 normally engage the intercept rings 4, thus placing the pressure vessel in compression between the hooks and its lower support points 9. The degree of this compression can be accurately calculated because via the present invention the vessel bottom is supported at differing heights which are dependent on the thermal expansion radially of the pressure vessel and which is, in turn, related to the vessel's vertical thermal expansion and contraction.

As shown by FIG. 2, the supporting ring 29 may be made as a plurality of circumferentially interspaced segments 29b, this permitting air cooling of the lower cylindrical ring 29 and, in addition, reducing the risk that it might possibly change in diameter due to thermal expansion and contraction. The segments 29b should be strong and rigid and free from any spring action. The two surfaces 27 and 28 should retain their designed angularities at all times.

Although the coolant pipes are relieved from vertical motion, they are still moved horizontally by the radial expansion and contraction of the vessel 1. Therefore, the steam generators 14 and 14' are supported on horizontally displaceable bearings 31 and 31' positioned as close as possible to the coolant pipes. This allows the steam generators to move in the axial or longitudinal directions of the coolant pipes and reduces stressing such as would occur if the steam generators were immovable horizontally. The pipe lines are provided with externally projecting shoulders 32 and 32' which are retained in annular recesses formed in the concrete construction 8 which has, of course, holes through which the coolant pipes extend to the steam generator. These recesses are formed around these holes. These recesses should provide enough space in the axial direction of the coolant pipes to permit their motion due to radial expansion and contraction of the vessel. However, the recesses should be proportioned so that in the event of a break in either coolant pipe or its connections between the shoulders and the vessel, the jet reaction will not result in excessive horizontal displacement of the steam generator having the pipe involved by the accident. Under normal conditions, the shoulders and their recesses serve to generally center the components of the installation.

What is claimed is:

1. A nuclear reactor pressure vessel support arrangement comprising a vertical substantially cylindrical pressure vessel having top and bottom portions, a substantially circular downwardly facing surface connected to said bottom portion, and a substantially circular upwardly facing surface on which said downwardly facing surface rests and which is fixed against displacement; wherein the improvement comprises said surfaces being substantially frusto-conical shapes with said upwardly facing surface upright and said downwardly facing surface inverted and slidable on said upwardly facing surface.

2. The arrangement of claim 1 in which said surfaces are concentric with the axis of said vessel and a foundation is below said vessel and a cylindrical base has a bottom portion supported by said foundation and a top portion on which said upwardly facing surface is formed.

3. The arrangement of claim 2 in which said base is formed by circumferentially interspaced cylindrical segments.

4. The arrangement of claim 1 in which said vessel's said top portion has means for holding it against upward displacement.

5. The arrangement of claim 1 in which said vessel has an upper portion and a horizontal coolant pipe has one end which is connected with said upper portion, and a steam generator, said pipe having another end and which is connected with said steam generator, and means for vertically supporting said steam generator for horizontal movement of the generator in the direction of said pipe.

6. The arrangement of claim 5 in which a concrete biological shield is positioned between said pressure vessel and said steam generator and has a horizontal hole through which said coolant pipe passes.

7. The arrangement of claim 6 in which said pipe has means for restraining it from excessive longitudinal displacement in the event it breaks and which normally permits said displacement to a degree preventing stressing of the pipe longitudinally by motion resulting from radial thermally induced motion of said vessel.

* * * * *